Aug. 23, 1932.  W. C. SCHWANTES  1,873,492
KITCHEN CABINET
Filed April 27, 1931  2 Sheets-Sheet 1
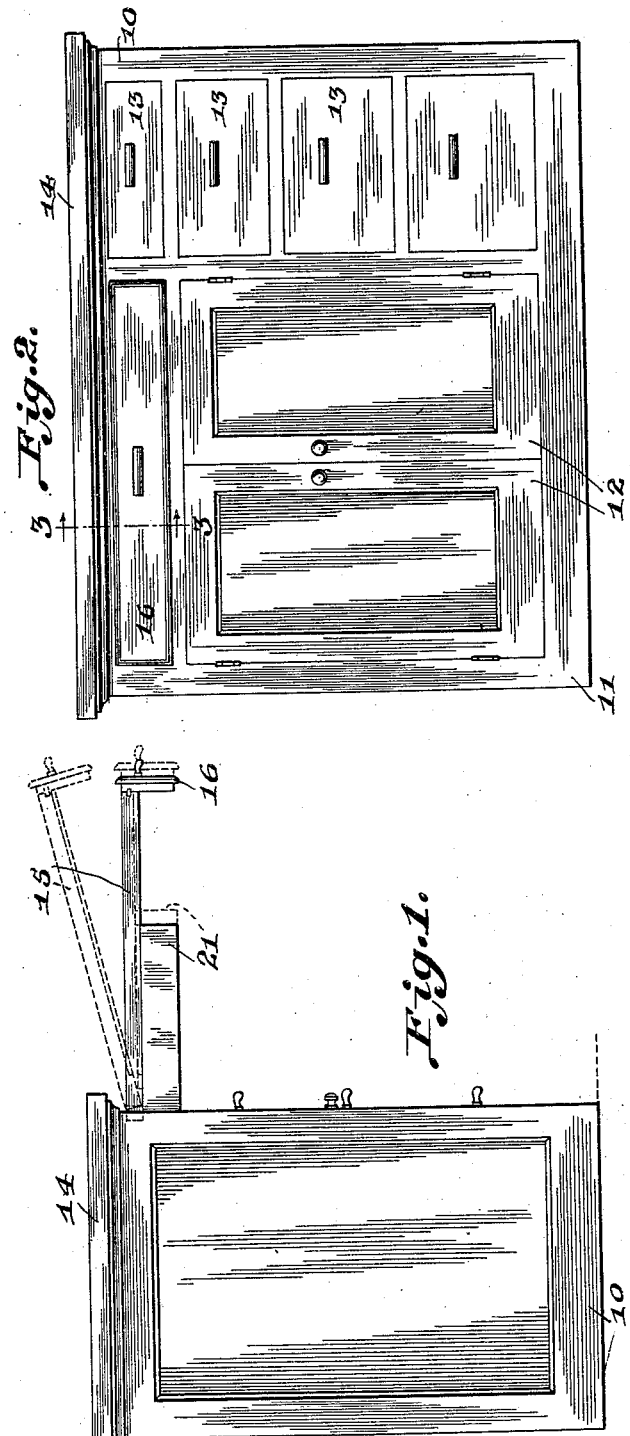
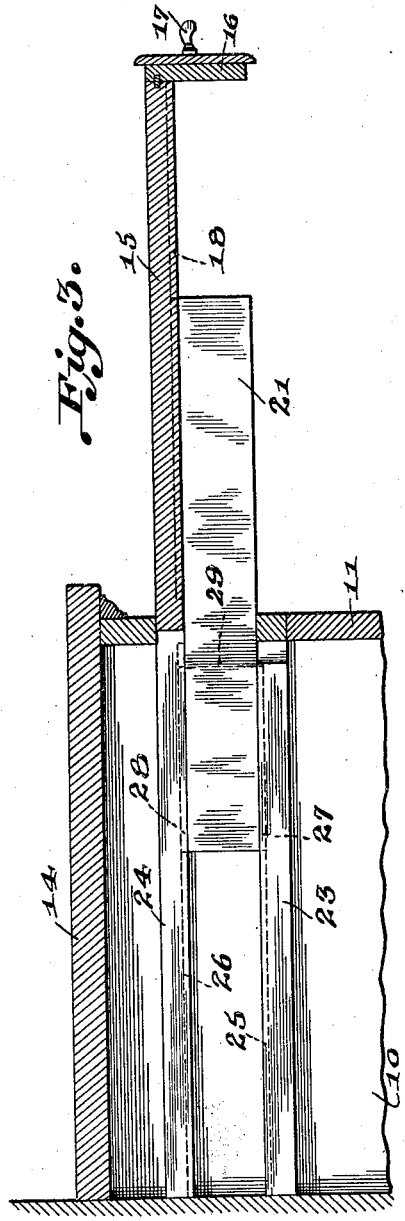
Inventor
William C. Schwantes
By Mawhinney & Mawhinney,
Attorneys Aug. 23, 1932.   W. C. SCHWANTES   1,873,492
KITCHEN CABINET
Filed April 27, 1931   2 Sheets-Sheet 2
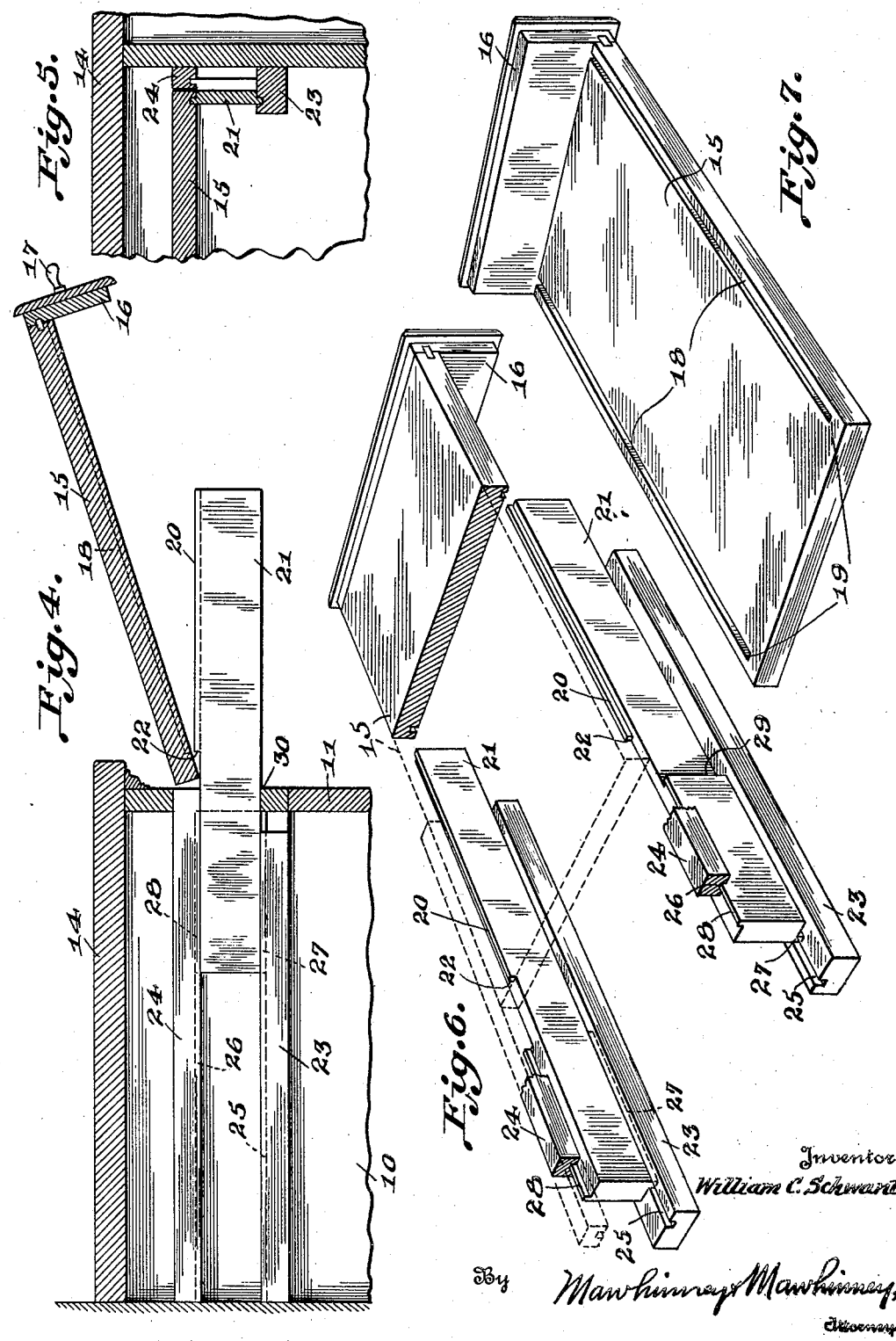

Patented Aug. 23, 1932

1,873,492

UNITED STATES PATENT OFFICE

WILLIAM C. SCHWANTES, OF MANITOWOC, WISCONSIN

KITCHEN CABINET

Application filed April 27, 1931. Serial No. 533,289.

The present invention relates to improvements in kitchen cabinets and has for an object to provide an improved kitchen cabinet having a working board of novel form, arrangement and mounting, on which may be accomplished such work as preparing dough for baking, cutting vegetables, etc.

Another object of the invention is to provide an improved baking or working board which will be slidable in the cabinet and capable of removal from the cabinet, and which will have the appearance of a drawer when concealed within the cabinet frame.

A further object of the invention resides in providing an improved construction of working board, supporting stiles and guide rails so arranged and disposed as to be strong, rigid and yet easily sliding and whereby a strong support for the board when extended will be furnished, at the same time allowing of the free separation of the board from the cabinet and its supporting stiles.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of an improved kitchen cabinet constructed according to the invention with the board extended.

Figure 2 is a front elevation of the cabinet with the board closed.

Figure 3 is a vertical section taken on the line 3—3 in Figure 2.

Figure 4 is a similar view with the parts in a subsequent position.

Figure 5 is a fragmentary cross section taken at right angles to Figure 4.

Figure 6 is a perspective view of the working board, stiles and guide rails, with the board partly broken away, and Figure 7 is a perspective view of the board taken from the underside.

Referring more particularly to the drawings the kitchen cabinet 10 is illustrated having a front wall 11 in which are provided the cupboard doors 12 and a bank of drawers 13 or other suitable arrangement. The top of the cabinet is indicated at 14.

Within the cabinet I mount a backing or working board 15 having the front wall 16 in imitation of a drawer and provided with an external handle 17 by which the board 15 may be moved into and out of its working position.

On its under side the board 15 is formed with longitudinal grooves 18 which terminate at the inner end of the board in stop shoulders 19.

These grooves 18 of the working board 15 are adapted to seat upon ribs 20 produced upon the upper edges of slidable stile bars 21. The ribs 20 terminate in shoulders 22 which are adapted to cooperate with, and strike against, the shoulders 19 of the working board 15, whereby to limit the outward slidable movement of the working board 15 with reference to the stile bars 21.

Now the stile bars 21 are mounted between pairs of guide rails 23 and 24. The lower guide rail 23 is preferably of greater width than the upper guide rail 24. In both guide rails are longitudinal grooves 25 and 26 for receiving therein the tongues 27 and 28 of the stile bars 21. These tongues 27 and 28 are laterally offset, the tongue 27 projecting downwardly from the inner longitudinal edge of the stile bar while the upper tongue 28 extends from the outer longitudinal edge of said stile bar.

As shown in Figure 5 the board 15 is adapted to move in the same plane with, and within, the upper guide shoulders 24 and the upper tongues 28 are offset outwardly from the ribs 20. There are shoulders 29 projecting laterally from the stile bars 21 to strike against the front wall 11 of the cabinet adjacent the opening 30 through which the stile bars 21 and the working board 15 slide. The groves 25 and 26 in the guide rails extend from end to end of such guide rails but the grooves 18 in the under side of the working board 15 terminate short of the end of the board as indicated in Figure 7.

In the use of the device the stile bars 21 and the working board 15 normally occupy an inner position within the cabinet, as shown in Figure 1, and the front wall 16 presents the appearance of a drawer.

The working board 15 may be pulled out to the position shown in Figure 3 and in full lines in Figure 1. In so doing the board 15 will initially slide upon the stile bars 21 until the shoulders 19 and 22 come together; whereupon the further outer movement of the working board 15 will be accompanied by the outer sliding therewith of the stile bars 21 until the shoulders 29 of the stile bars strike the front wall 11 of the cabinet. This outermost position of the stile bars is indicated in Figure 4, the arrangement being such that the inner end of the working board 15 is then free of the front wall 11 of the cabinet and the working board 15 may thereupon be lifted up as indicated in dotted lines in Figure 1 and in full lines in Figure 4, so that it is possible to entirely detach the working board 15 from the cabinet and from the stile bars 21. The board 15 may then be placed upon the top 14 of the cabinet or upon any other appropriate support.

The board when not in use will be pushed in, the front wall 16 encountering the slides 21 and forcing them in also.

The working board 15 will be suitable for the working of dough and for the cutting of vegetables and for other culinary operations. The device is easily slidable and yet is strong and rigid and provides for holding the board 15 in a staunch condition when extended, while at the same time allowing for its complete detachment from the cabinet.

It is obvious that various changes and modifications may be made in the details of construction and design of the above specifically described embodiment of this invention without departing from the spirit thereof, such changes and modifications being restricted only by the scope of the following claims.

What is claimed is:—

1. A cabinet having a slide opening therein and provided at the lower portion of the opening and in the opposite sides thereof with longitudinal upwardly opening guiding grooves and provided at the upper portion of the opening and in the opposite sides thereof with longitudinal downwardly opening guiding grooves spaced apart a distance greater than the space between the lower grooves, a sliding stile mounted in the cabinet in each side of the opening, each stile having a longitudinal rib slidably engaging in the adjacent lower guiding groove and extending throughout a portion only of the rear end of the stile, the lower guiding grooves terminating at the inner side of the front frame of the cabinet and the rib of the stile adapted to engage said front wall of the cabinet to limit the projection of the stile from the cabinet, each stile having an outwardly offset rib at its upper edge adapted to engage in the adjacent upper guiding groove, a bake board slidably mounted upon the upper edges of the stiles and having in its lower surface guiding grooves, said stiles having forward upstanding ribs offset inwardly and out of line with the rear upstanding ribs of the stiles for engaging in the grooves of the bake board to limit the sliding movement thereof on the stiles.

2. A cabinet having a slide opening therein extending through the front wall thereof, a pair of lower guide rails disposed in the cabinet in the lower opposite sides of said opening and terminating against the front wall of the cabinet and provided with upwardly opening guide grooves therein, a pair of top rails mounted in the cabinet in the upper opposite side portions of said slide opening and having downwardly facing guide grooves therein offset outwardly from the vertical planes of the lower guide grooves, a pair of stiles disposed in the opening of the cabinet one in each side thereof, said stiles having depending ribs at their lower end portions engaging in the grooves of the lower guide rails and having upwardly extending ribs at their rear portions offset outwardly from the lower ribs and engaging in the grooves of the upper guide rails, said stiles having at their forward ends upstanding ribs disposed substantially in the vertical plane of the lower rear ribs of the stiles, and a bake board slidably mounted upon the upper edges of the stiles and having in its under side grooves adapted to receive the forward upstanding ribs of the stiles, said grooves of the bake board terminating in spaced relation to the rear end thereof to provide stops to limit the sliding movement of the bake board on the stiles and to admit the removal of the bake board by lifting the same from the stiles when the latter are projected from the cabinet.

In testimony whereof I affix my signature.

WILLIAM C. SCHWANTES.